United States Patent [19]

Noda et al.

[11] Patent Number: 5,711,925
[45] Date of Patent: Jan. 27, 1998

[54] SYNTHESIS OF PURE DISILICON HEXAFLUORIDE

[75] Inventors: Tetsuiji Noda; Hiroshi Suzuki; Hiroshi Araki, all of Tsukuba, Japan

[73] Assignee: National Research Institute for Metals, Tsukuba, Japan

[21] Appl. No.: 526,919

[22] Filed: Sep. 12, 1995

[51] Int. Cl.$^6$ ........................................... C01B 33/08
[52] U.S. Cl. ................................. 423/341; 423/342
[58] Field of Search ................................ 423/341, 342

[56] References Cited

FOREIGN PATENT DOCUMENTS 63-195108  8/1988  Japan.
2-283610  11/1990  Japan ....................... 423/341

OTHER PUBLICATIONS

Weast, "Handbook of Chemistry & Physics", 52nd edition, 1971 (no month), pp. C-162.

*Primary Examiner*—Ngoc-Yen Nguyen
*Attorney, Agent, or Firm*—Wenderoth, Lind & Ponack

[57] ABSTRACT

Highly pure disilicon hexafluoride is synthesized by a process in which a suspension of a fluorination agent is made by dispersing this fluorination agent in an oxybenzene compound as a solvent and disilicon hexachloride is dripped in the suspension to be caused to react with the fluorination agent in nitrogen gas flows under atmospheric pressure, the oxybenzene being expressed by a following formula:

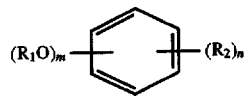

(where each of $R_1$ and $R_2$ is an alkyl group alternatively having one or more substituents; carbon numbers summed up by $R_1$ and $R_2$ are equal to at least 2; and $m \geq 1$ and $n \geq 0$).

2 Claims, 2 Drawing Sheets

SYNTHESIS OF PURE DISILICON HEXAFLUORIDE

FIELD OF THE INVENTION

The present invention relates as synthesis of pure disilicon hexafluoride. More particularly, the present invention relates to a novel method of synthesizing disilicon hexachloride in high purity.

DISCLOSURE OF THE PRIOR ART

Disilicon hexafluoride has been regarded as useful for a raw material of silicon semiconductors and it is also promising to an operating gas for separating silicon isotopes by infrared multiphoton dissociation. This disilicon hexafluoride has been synthesized by a well-known halogen exchanging method in which disilicon hexafluoride is fluorinated by such a fluorination agent as zinc fluoride or antimony trifluoride.

In this method, however, since it is difficult to control a reaction when disilicon hexachloride is caused to react directly with the fluorination agent, a reaction temperature increases and the disilicon hexafluoride produced decomposes easily, and the reaction is prematurely terminated because surfaces of the fluorination agent are covered with a product.

In order to overcome these problems, a synthesizing method has been proposed, in which a reaction is slowly accelerated by using such an organic solvent as butyl ether, alkyl chloride, benzene, toluene, xylene or chlorobenzene (Japanese Patent Provisional Publication No. 195,108/1988).

Even in this method, such a by-product as silicon tetrafluoride accounts for a considerable percentage of reaction products and it is, therefore, very difficult to obtain highly pure disilicon hexafluoride with a small amount of the by-product.

An object of the invention is to provide a method of synthesizing highly pure disilicon hexafluoride containing impurities such as silicon tetrafluoride in an amount of within 1%, and synthesizing a large amount of the same so as to apply it as an operating gas for separating isotopes.

This and other objects, features and advantages of the invention will become more apparent on reading the following detailed description and the accompanying drawings.

DETAILED DESCRIPTION OF THE INVENTION

Figure 1:
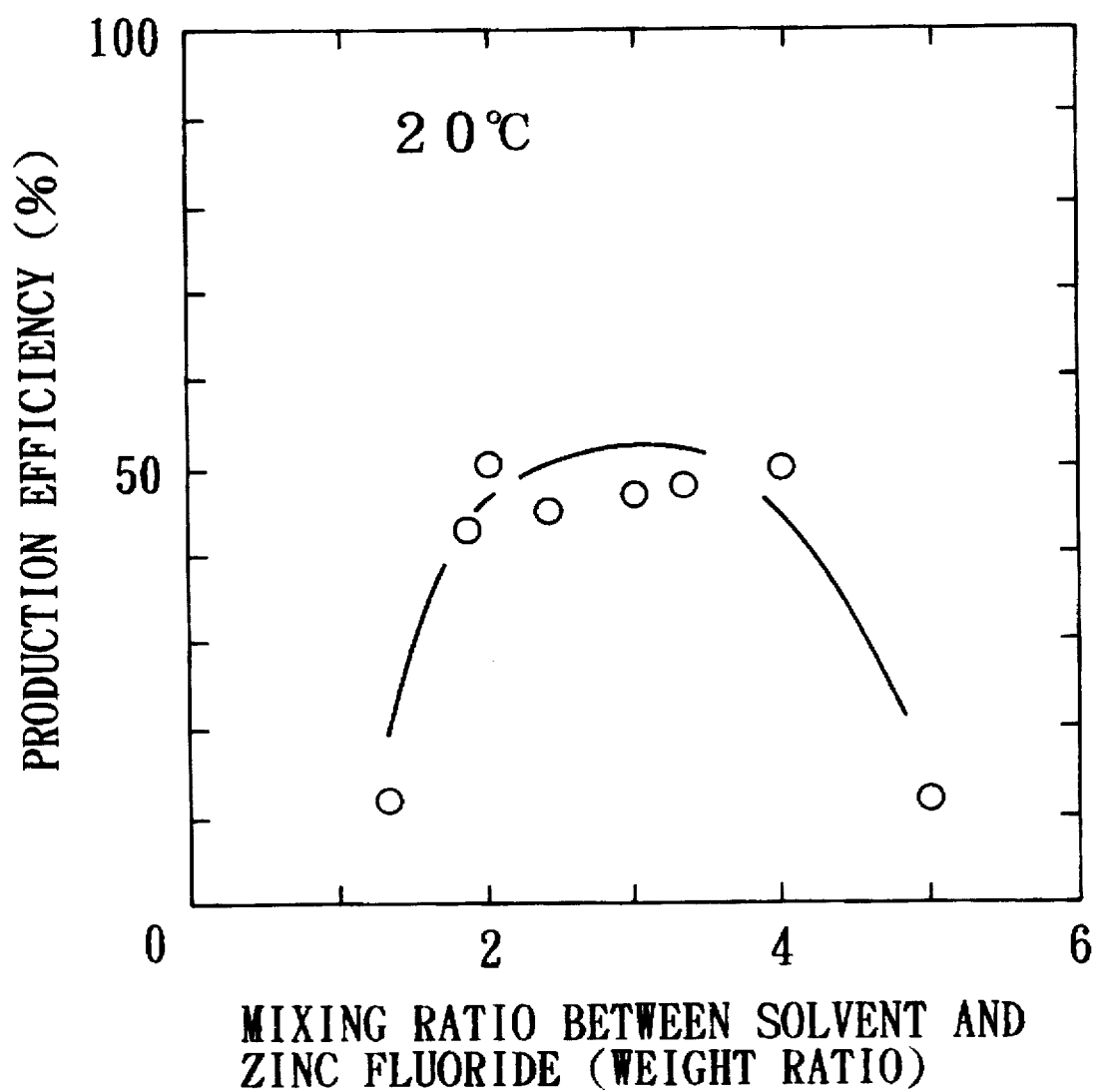
FIG. 1 is a graph depicting the relationship between a product yield of disilicon hexafluoride ($Si_2F_6$) and a mixing ratio of a solvent and a fluorination agent.

The present invention provides a method of synthesizing pure disilicon hexafluoride comprising the steps of making a suspension of a fluorination agent dispersed in an oxybenzene compound and causing disilicon hexachloride to react with said fluorination agent in nitrogen gas flows under atmospheric pressure, wherein said oxybenzene compound is expressed by a following formula:

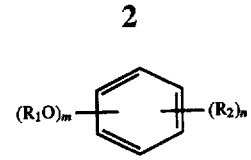

(where each of $R_1$ and $R_2$ is an alkyl group alternatively having one or more substituents; carbon numbers summed up by $R_1$ and $R_2$ are equal to at least 2; and $m \geq 1$ and $n \geq 0$).

A reaction vessel, reaction appliances, a fluorination agent and a solvent to be used should preferably be sufficiently dehydrated in advance. This is because disilicon hexachloride and disilicon hexafluoride produced are easily hydrolyzed. An interior of the reaction vessel should also be shielded from air during a reaction.

Any fluorination agent including well-known ones may be available for the fluorination agent to be employed. There is no particular limitation, but zinc fluoride is preferably suitable among them because a reaction is slowly accelerated. It is also desirable for the fluorination agent to be sufficiently dehydrated by heating it at about 300° C. to keep an atmospheric pressure at $10^{-2}$ Torr.

An oxybenzene compound to be used as a solvent should preferably be subjected to a dehydration treatment for a period of at least one week by means of a molecular sieve, for example. A mixing ratio in weight of this oxybenzene compound and the fluorination agent should preferably be about 2 to 4.

The oxybenzene compound is a compound in which one or more oxygen atoms are directly attached to a benzene ring, which is typically exemplified by such alkoxybenzenes as ethoxybenzene or propoxybenzene, such alkoxytoluenes as methoxytoluene, ethoxytoluene or dimethoxytoluene, or such alkoxyxylenes as methoxyxylene or dimethoxyxylene. Ethoxybenzene, methoxybenzene or methoxytoluene is more preferable among them. At least one alkyl group or other substituent may be attached to these oxybenzene compounds.

A reaction is performed by dripping disilicon hexachloride into a suspended solution of the fluorination agent dispersed in the oxybenzene compound. This dripping is operated under such a condition as a temperature range of within 15° to 40° C., a nitrogen gas atmosphere and an atmospheric pressure. The resultant gas, for example, can be taken into a sample trap kept at −85° to −90° C. through an impurity trap maintained at −20° to −25° C.

Pure disilicon hexafluoride containing impurities such as silicon tetrafluoride in an amount of less than 1% is synthesized by causing the disilicon hexachloride to react with the fluorination agent in the suspension with the oxybenzene compound which has a boiling point of more than 100° C. and a property to calmly combine with the disilicon hexachloride.

Disilicon hexafluoride is so excellent an operating material for separating isotopes that a great amount of isotopes may possibly be obtained with ease. It is, therefore, considered that this invention will contribute to progress in such a field as materials for nuclear power and semiconductors.

Some embodiments of the invention will now be described by way of examples and with reference to the drawings.

EMBODIMENTS

EXAMPLE 1

Zinc fluoride in an amount of 50 g was dehydrated at 300° C. for about eight hours and it was placed in a glass vessel having a volume of one liter under a nitrogen gas atmosphere. This zinc fluoride was then suspended in sufficiently dehydrated ethoxybenzene in volume of 120 cc. Disilicon hexachloride in volume of 8 cc was dripped at a rate of 1 cc/minute into the vessel in nitrogen gas flows under about 1.02 atm. The suspension, of which temperature was kept at 37° C., was slowly stirred in order that the disilicon hexachloride does not directly contact with the zinc fluoride.

A cooler kept at 0° C. was connected to a gas exit of the reaction vessel to prevent the solvent from evaporating. A produced gas was taken into a sample trap kept at 90° C. through an impurity trap maintained at 20° C. It was confirmed that disilicon hexafluoride in amount of 6 g was synthesized.

As shown in Table 1, a product yield of the disilicon hexafluoride was 75% relative to the disilicon hexachloride used for a raw material.

As shown in Table 2, the resultant disilicon hexafluoride has high purity of 99.9%, while the percentage of silicon tetrafluoride ($SiF_4$) produced as an impurity was about 0.1%.

EXAMPLE 2

Disilicon hexafluoride was synthesized in the same manner as in Example 1 except that methoxytoluene was employed as a solvent.

As shown in Table 1, a product yield of the disilicon hexafluoride was highest at a reaction temperature of 37° C. and was 51%.

As shown in Table 2, the resultant disilicon hexafluoride has high purity of 99.8%, while the percentage of silicon tetrafluoride ($SiF_4$) produced as an impurity was about 0.2%.

COMPARISON 1 TO 3

Reactions were performed in the same manner as in Example 1, except that decane add butyl ether (Comparison 1), benzene (Comparison 2), and butyl chloride (Comparison 3) were employed as a solvent, respectively.

As shown in Tables 1 and 2, both product yield and purity were deteriorated by far as compared with those of Examples 1 and 2.

TABLE 1

| Solvent | Ex. 1 Ethoxy-benzene | Ex. 2 Methoxy-toluene | Comp. 1 Decane + Butyl ether | Comp. 2 Benzene | Comp. 3 Butyl Chloride |
|---|---|---|---|---|---|
| Temp. (°C.) | 37 | 37 | 85 | 28 | 28 |
| product yield (%) | 75 | 51 | 15 | 0 | 0 |

TABLE 2

| Solvent | Ex. 1 Ethoxy-benzene | Ex. 2 Methoxy-toluene | Comp. 1 Decane + Butyl ether | Comp. 2 Benzene | Comp. 3 Butyl Chloride |
|---|---|---|---|---|---|
| Temp (°C.) | 37 | 37 | 85 | 28 | 28 |
| Purity (%) | 99.8 | 99.8 | 12 | — | — |
| $SiF_4$ content (%) | 0.1 | 0.2 | 88 | 33 | — |

*) Mark "—" means unmeasurable.

EXAMPLE 3

Disilicon hexafluoride was synthesized in the same manner as in Example 1, except that a reaction temperature was 20° C. and a mixing ratio of the solvent to the zinc fluoride was varied.

FIG. 1 points out high product yields of 40 to 60% at mixing ratios in weight of the solvent relative to the zinc fluoride of 2 to 4.

EXAMPLE 4

Disilicon hexafluoride was synthesized by using several solvents at a reaction temperature within the range of 5° C. (278K) to 90° C. (363K).

Figure 2:
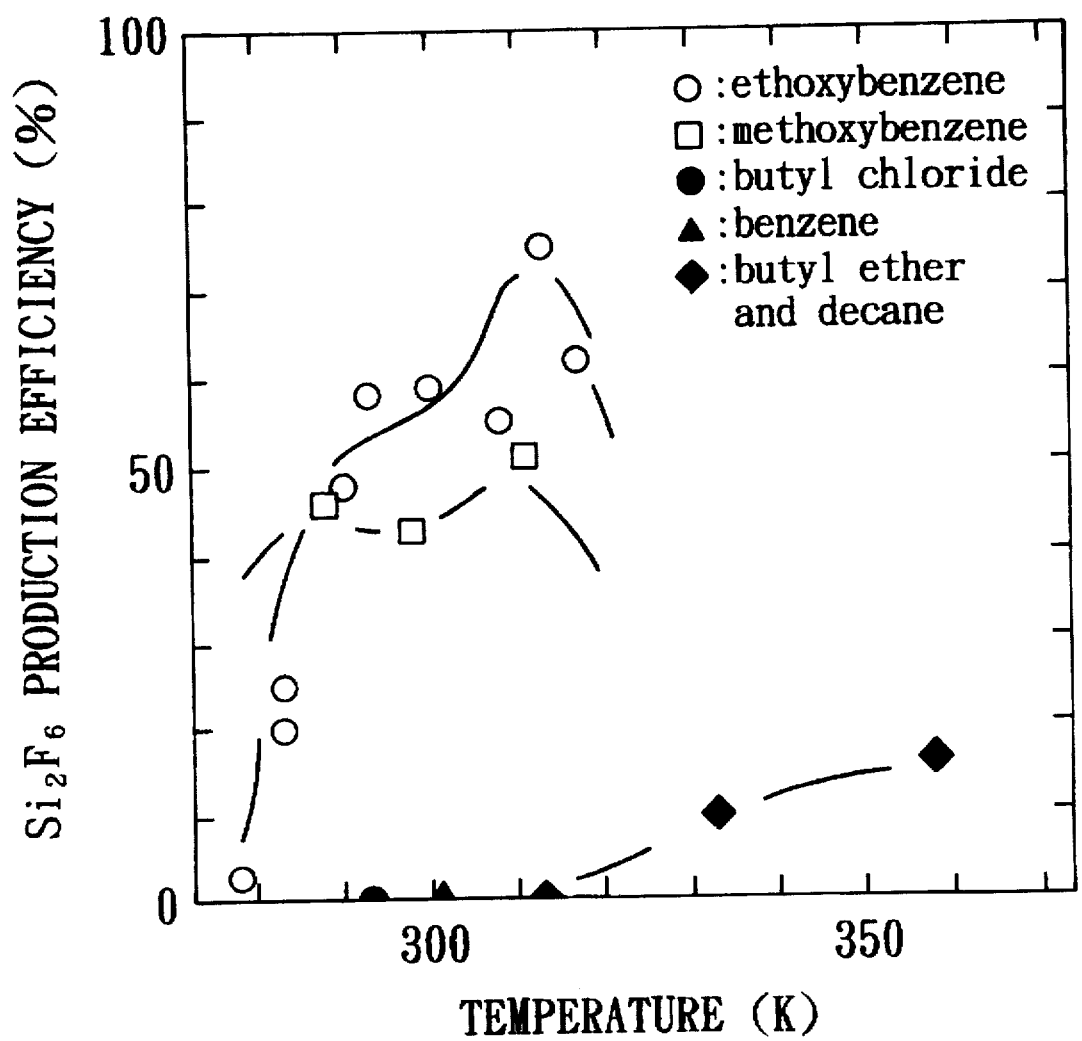
FIG. 2 is a graph depicting the relationship between a product yield of disilicon hexafluoride ($Si_2F_6$) and a reaction temperature for several solvents.

As depicted in FIG. 2, disilicon hexafluoride was synthesized at product yields of 50 to 75% by using ethoxybenzene and methoxybenzene at temperatures of 15° C. (288K) to 40° C. (313K).

Unlike this, in the cases where butyl chloride and benzene were respectively used, the product yield was 0%.

In the cases where a mixed solvent with butyl ether and decane is used, the product yield was about 10 to 15%, though disilicon hexafluoride was synthesized at 60° C. (333K) or higher. Purity was also bad since silicon tetrafluoride accounted for most of the product.

It is needless to say that this invention is not restricted by these examples and that various modifications in detail are possible.

What is claimed is:

1. A method of synthesizing pure disilicon hexafluoride containing impurities in an amount of less than 1%, comprising the steps of adding disilicon hexachloride to a suspension in which a fluorination agent is suspended in ethoxybenzene or methoxytoluene, and causing said disilicon hexachloride to react with said fluorination agent in a nitrogen gas flow under atmospheric pressure.

2. The method as claimed in claim 1, wherein a mixing ratio in weight of said ethoxybenzene or methoxytoluene to said fluorination agent is 2–4.

* * * * *